Patented Dec. 20, 1932                                  1,891,448

UNITED STATES PATENT OFFICE

WILLIAM L. RINTELMAN, OF MILWAUKEE, WISCONSIN, ASSIGNOR, BY MESNE ASSIGNMENTS, TO E. I. DU PONT DE NEMOURS & COMPANY, A CORPORATION OF DELAWARE

PROCESS OF PURIFYING DIPHENYL-1,2,5,6-ANTHRAQUINONE DITHIAZOLE BODIES

No Drawing.         Application filed April 20, 1931.  Serial No. 531,635.

This invention relates to a process of purifying diphenyl-1,2,5,6-anthraquinone-dithiazole bodies.

More specifically this invention relates to a process of purifying diphenyl-1,2,5,6-anthraquinone-dithiazole, diphenyl-1,2,5,6-anthraquinone-dithiazoline, and mixtures of the two.

The preparation of compounds of this type, which are valuable yellow dyestuffs, has been described in U. S. Patents 1,090,621 and 1,095,731. The earlier of these patents suggests the purification of the dyestuff by recrystallization from boiling nitrobenzene. Although this patent also discloses the property of the dyestuff of dissolving in concentrated sulfuric acid and being precipitated therefrom by means of water, it has not been appreciated that this property may be taken advantage of to effect separation of the dyestuff from its impurities and to isolate the highly pure dyestuff in a greener and brighter shade than was obtainable from nitrobenzene recrystallization.

I have now found that by suitably regulating the concentration of the sulfuric acid, diphenyl-1,2,5,6-anthraquinone-dithiazole bodies may be effectively separated from their impurities. Moreover, the dyestuff thus obtained is purer, exhausts more cleanly, and gives greener and brighter shades upon cotton than when purified from nitrobenzene. Furthermore, my novel process is more economical than the old nitrobenzene process, providing, of course, that undue losses of the dyestuff are avoided in carrying out the process as more fully set forth below.

It is therefore an object of this invention to provide a simple and efficient process of purifying diphenyl-1,2,5,6-anthraquinone-dithiazole bodies.

It is a further object of this invention to obtain 1,2,5,6-anthraquinone-dithiazole bodies in a highly pure state.

Other and further important objects of this invention will become apparent from the following description and appended claims.

I have found that with an average crude dyestuff the optimum concentration of sulfuric acid for my process is about 83 to 87%. If the concentration is allowed to drop below 80%, some of the impurities will be precipitated along with the dyestuff, thereby defeating the object of the process. If a concentration above 90% is selected, a substantial portion of the dyestuff stays in solution, thus rendering the process uneconomical unless practiced by a repeated or cyclic system using the mother liquor to purify the next batch. A simple procedure to follow in regulating the concentration of the acid is to dissolve the dyestuff in concentrated sulfuric acid of above 90% strength, and then add sufficient water to reduce the concentration to about 85%. A pure dyestuff is thus obtained with great efficiency.

Instead of water, other diluents may be used, such as, for example, glacial acetic acid or dilute sulfuric acid.

The novel purification process may be combined with the process of formation of the dyestuff where the reaction is carried out in concentrated sulfuric acid. In this case, the reaction mass is diluted to about 85% sulfuric acid concentration, whereupon the dyestuff precipitates directly in a high state of purity and may be recovered by filtering and washing in the usual manner.

Without limiting my invention to any particular procedure, the following examples in which parts by weight are given, will serve to illustrated my method in its preferred form.

*Example 1*.—10 parts of the crude diphenyl-1,2,5,6-anthraquinone-dithiazole body as obtained, for instance, according to the process disclosed in either of U. S. Patents 1,090,621 and 1,095,731 or by condensing a 1,5-dimercapto-2,6-diamino-anthraquinone body with a body of the formula

wherein R is an aromatic carbocyclic ring, X is halogen or hydrogen and Y is oxygen or two halogens in an inorganic medium as is more fully described in copending application, Serial No. 531,636, filed by myself and Robert J. Goodrich of even date herewith, are dissolved in 150 parts of sulfuric acid monohydrate at a temperature of about 30° to 40° C. 27 parts of water are carefully dropped in and the mass is cooled to room temperature. The mixture is next filtered, washed with 50 parts of 83% sulfuric acid, and finally with water until free of acid. It is then sucked dry. The filter cake upon drying constitutes the dyestuff in a high state of purity.

*Example 2.*—10 parts of the 1,5-sulfide derivative of 2,6-diamino-anthraquinone, obtainable, for instance, by passing a stream of air through an aqueous, alkaline solution of the disodium salt of 1,5-dimercapto-2,6-diamino-anthraquinone as described more fully in my copending application, Serial No. 531,633, filed of even date herewith, are dissolved in 200 parts of sulfuric acid monohydrate. The temperature of the solution is adjusted to about 35 to 45° C. and 7.5 parts of benzaldehyde are then added and the reaction mass stirred at about 35 to 45° C. for a period of about 20 hours. If desired, the temperature may be raised to about 70° C., at which temperature the reaction proceeds much faster. When the reaction is substantially complete, the mass is gradually diluted with water to a sulfuric acid concentration of about 85%, cooled to about 20 to 25° C., and the greenish yellow crystals which separate are filtered off, and washed first with 100 parts of 83% sulfuric acid, and then with water until free of acid. The dyestuff thus obtained constitutes a 1,2,5,6-anthraquinone-diphenyl-dithiazole body in a state of high purity. Its dyeings upon cotton from a vat, produced in the ordinary manner, exhibit great brilliance and purity of shade.

*Example 3.*—10 parts of 1,5-dimercapto-2,6-diamino-anthraquinone are dissolved in 200 parts of sulfuric acid monohydrate, and the temperature of the solution is adjusted to about 35 to 45° C. 10 parts of benzaldehyde are now added and the reaction mass is stirred at about 35 to 45° C. for a period of about 20 hours. Higher temperatures may be used if desired to speed up the reaction. When the reaction is substantially complete, the mass is gradually diluted with water to a sulfuric acid concentration of about 85%, cooled to about 20 to 25° C., and the greenish yellow crystals which separate are filtered and washed as in Example 2. The product exhibits the same high purity as in Example 2.

*Example 4.*—10 parts of the 1,5-sulfide derivative of 2,6-diamino-anthraquinone, obtainable as in Example 2, are dissolved in 200 parts of 7% oleum at room temperature. 8 parts of benzaldehyde are now added, the mass is stirred for 1 hour at about 25–30° C., and then heated gradually during a period of about 1 hour to 70° C. and maintained at this temperature for about 2 hours. The mass is now cooled to about 25–35° C. and 37 parts of water are gradually dropped in over a period of 5 hours. The mass is then stirred at about 25 to 30° C. for about 6 hours. The greenish-yellow crystals obtained are filtered off and washed with 100 parts of 83% sulfuric acid. The filter cake is now sludged up with 800 parts of cold water, filtered, and washed with cold water until free of acid. Upon drying and grinding the dyestuff (a 1,2,5,6-anthraquinone-diphenyl-dithiazole body) is obtained in a state of high purity.

*Example 5.*—10 parts of a crude dyestuff as defined in Example 1 are suspended in 170 parts of 85% sulfuric acid, warmed to 80–90° C., and stirred at this temperature for about 3 hours. The mass is then slowly cooled to room temperature, and after stirring for another 6 hours the mass is filtered, washed and dried as in Example 1. The filter cake constitutes the dyestuff in a state of high purity, as in Example 1. In this example it is not necessary to dissolve the entire dyestuff, since the impurities are extracted by means of the 85% sulfuric acid.

Thus, although I have indicated a sulfuric acid concentration range of about 83 to 87% as including the preferred concentrations, this range merely indicates the optimum for crude dyestuff of the average purity resulting from technical operation and concentrations above and below said limits may be used with satisfactory results on occasional batches of crude dyestuff. The operativeness of a given concentration of sulfuric acid depends, to a considerable extent, upon the relative impurity of the dyestuff, upon the quantity of sulfuric acid used, and upon the temperature at which the process is carried out. Thus, if a sufficiently large quantity of acid is used, a concentration of 76% may be effective to precipitate the dyestuff in pure form. Again, if the crude dyestuff is relatively pure and if little sulfuric acid is used, 93% sulfuric acid may be used for the above purpose without losing too much dyestuff. As pointed out above, in this case the saturated mother liquor after purification of a given quantity of dyestuff may be used to purify another quantity thus avoiding possible waste of dyestuff due to its high solubility in 93% sulfuric acid.

The term "diphenyl-1,2,5,6-anthraquinone-dithiazole body" as used in the claims is meant to cover both the thiazole form of said bodies and the thiazoline or dihydro-thiazole form as well as mixtures of the thiazole and the thiazoline bodies.

I am aware that numerous details of the process may be varied through a wide range without departing from the principles of this invention, and I, therefore, do not purpose limiting the patent granted hereon otherwise than necessitated by the prior art.

I claim as my invention:

1. The process of purifying an impure diphenyl-1,2,5,6-anthraquinone dithiazole body which comprises treating the impure body with sulfuric acid having a concentration from about 76 to 93% and recovering the insoluble portion of the dyestuff.

2. The process of purifying an impure diphenyl-1,2,5,6-anthraquinone dithiazole body which comprises treating the impure body with sulfuric acid having a concentration of about 80 to 90%, and recovering the insoluble portion of the dyestuff.

3. The process of purifying a technical diphenyl-1,2,5,6-anthraquinone dithiazole body which comprises treating the same with sulfuric acid of about 83 to 87% concentration and recovering the insoluble portion of the dyestuff.

4. The process of purifying an impure diphenyl-1,2,5,6-anthraquinone dithiazole body which comprises crystallizing the same from sulfuric acid having a concentration of about 85%.

5. A process for preparing a yellow vat dyestuff in a state of high purity, which comprises condensing a 1,5-dimercapto-2,6-diamino-anthraquinone body with benzaldehyde in a sulfuric acid medium of above 90% concentration, diluting the reaction mass to a sulfuric acid concentration of about 83 to 87% and recoving the precipitated dyestuff.

In testimony whereof I have hereunto subscribed my name at Carrollville, Milwaukee County, Wisconsin.

WILLIAM L. RINTELMAN.